United States Patent [19]

Lundy et al.

[11] Patent Number: 5,001,180

[45] Date of Patent: Mar. 19, 1991

[54] RELEASE AGENTS FOR POLYCARBONATE MOLDING COMPOSITIONS

[75] Inventors: Charles E. Lundy; Sivaram Krishnan, both of Pittsburgh; Donald K. Booher, Bethel Park, all of Pa.

[73] Assignee: Mobay Corporation, Pittsburgh, Pa.

[21] Appl. No.: 430,698

[22] Filed: Nov. 1, 1989

[51] Int. Cl.⁵ .................................................. C08K 5/11
[52] U.S. Cl. .................................... 524/314; 524/311; 524/315
[58] Field of Search ................ 524/314, 315, 311

[56] References Cited

U.S. PATENT DOCUMENTS

| | | | |
|---|---|---|---|
| 3,784,595 | 1/1974 | Schirmer et al. | 524/315 |
| 4,065,436 | 12/1977 | Adelmann et al. | 525/462 |
| 4,097,435 | 6/1978 | Rawlings et al. | 524/277 |
| 4,131,575 | 12/1978 | Adelmann et al. | 524/311 |
| 4,143,024 | 3/1979 | Adelmann et al. | 524/287 |
| 4,425,458 | 1/1984 | Lindner et al. | 524/314 |

FOREIGN PATENT DOCUMENTS

WO89/0385 3/1989 PCT Int'l Appl.

*Primary Examiner*—John Kight, III
*Assistant Examiner*—Kathryne E. Shelborne
*Attorney, Agent, or Firm*—Joseph C. Gil; Aron Preis

[57] ABSTRACT

A monoester derived from guerbet alcohol and a monocarboxylic acid or a hydroxy carboxylic acid was found to be an effective mold release agent for a thermoplastic molding composition which comprise an aromatic polycarbonate resin. The alcohol of the invention is a guerbet alcohol having about 20 to 60 carbon atoms and the monoacid is characterized in that it has about 1 to 22 carbon atoms.

6 Claims, No Drawings

RELEASE AGENTS FOR POLYCARBONATE MOLDING COMPOSITIONS

FIELD OF THE INVENTION

The present invention relates to polycarbonate molding compositions and more particularly to mold release agents for these compositions.

SUMMARY OF THE INVENTION

A monoester derived from guerbet alcohol and a monocarboxylic acid or a hydroxy carboxylic acid was found to be an effective mold release agent for a thermoplastic molding composition which comprise an aromatic polycarbonate resin. The alcohol of the invention is a guerbet alcohol having about 20 to 60 carbon atoms and the monoacid is characterized in that it has about 1 to 22 carbon atoms.

DESCRIPTION OF THE PRIOR ART

It has long been recognized in the art that polycarbonate molding compositions are useful for the preparation of molded articles having superior mechanical and physical properties. It has also been recognized that the unmodified resin has a strong affinity to mold surfaces and thus requires a fairly high force to release the molded article from its mold. Esters of simple alcohols are known to be effective mold release agent for thermoplastic polycarbonate resins. Among the relevant art in this regard mention may be made of U.S. Pat. Nos. 3,784,595; 4,065,436; 4,097,435; 4,131,575; and 4,143,024.

Diesters of guerbet alcohols and their use as mold release agents in polycarbonate molding compositions have been disclosed in U.S. Pat. No. 4,425,458. The monoesters of the present invention are considerably more effective as mold release agents than are the diester counterparts.

DETAILED DESCRIPTION OF THE INVENTION

The thermoplastic molding composition of the present invention comprise an aromatic thermoplastic polycarbonate resin and a mold releasing effective amount of a monoester derived from a guerbet alcohol and a suitable acid; the molding composition and the articles molded therefrom are characterized by their clarity and by their virtual freedom from haze.

In the context of the invention, an effective amount of monoester is that amount which is sufficient to cause a lowering of the force needed to release an article from its mold as compared to a similar composition and article which contain none of the monoester of the invention. Preferably, the amount of the monoester is about 0.05 to 3.0%, most preferably about 0.1 to 1.5% relative to the weight of the composition.

Polycarbonate resins suitable in the practice of the invention are well known and are readily available in commerce. Among the suitable resins mention may be made of Makrolon polycarbonate resins which are the products of Mobay Corporation of Pittsburgh, Pa.

Thermoplastic aromatic polycarbonate resins suitable in the context of the present invention have a weight average molecular weight of about 10,000 to 200,000 preferably 15,000 to 80,000. Polycarbonate of this type are based on dihydroxy compounds of the formula

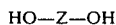

HO—Z—OH wherein 2 is a divalent aromatic radical having 6 to 20 carbon atoms.

These include both mono nuclear and poly nuclear dihydroxy compounds, which may contain heteroatoms and may be substituted. The following are among the suitable compounds: hydroquinone, resorcinol, dihydroxydiphenyls, bis-(hydroxyo phenyl)-alkanes, bis-(hydroxyphenyl)-cycloalkanes, bis(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones, and $\alpha,\alpha'$-bis-(hydroxyphenyl)-diisopropyl-benzenes, and their nuclear-alkylated and nuclear-halogenated compounds. These and other suitable dihydroxy compounds are described in U.S. Pat. Nos. 3,028,365; 2,999,835; 3,148,172; 3,271,368; 2,991,273; 3,271,367; 3,280,078; 3,014,891; and 2,999,846, all of which are incorporated herein by reference, in German Offenlegungsschriften Nos. 1,570,703; 2,063,050; 2,036,052; and 2,211,956; French Patent Specification No. 1,561,518 and in the monograph H. Schnell, Chemistry and Physics of Polycarbonates, Interscience Publishers, New York 1964.

Examples of preferred dihydroxy compounds are: 4,4'-dihydroxyphenyl, 2,2-bis-(4-hydroxyphenyl)-propane, 2,4-bis-(4-hydroxyphenyl)-2-methylbutane, 1,1-bis-(4-hydroxyphenyl)cyclohexane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane bis-(3,5-dimethyl-4-hydroxyphenyl)-2-methylbutane, 1,1-bis-(3,5-dimethyl-4-hydroxyphenyl)-cyclohexane, $\alpha,\alpha'$-bis(3,5-dimethyl-4-hydroxphenyl)-p-diisopropylbenzene, 2,2-bis-(3,5-dichloro-4-hydroxyphenyl)-propane, and 2,2-bis-(3,5-dibromo-4-hydroxyphenyl)-propane.

Examples of particularly preferred dihydroxy compounds are: 2,2-bis-(4-hydroxyphenyl)-propane, 2,2-bis-(3,5-dimethyl-4-hydroxyphenyl)-propane, 2,2-bis(3,5-dichloro-4-hydroxyphenyl-propane, 2,2-bis-(3,5-dibromo-4-hydroxyphenyl)-propane, and 1,1-bis-(4-hydroxyphenyl)-cyclohexane.

Mixtures of the above mentioned dihydroxy compounds may also be used.

Small amounts of branching agent, preferably between about 0.05 and 2.0 mol (relative to diphenols employed) may be added. These are compounds having a functionality of three or more, in particular those with three or more phenolic hydroxyl groups, which are added for the purpose of improving the flow properties. Examples of these compounds include phloroglucinol, 4-dimethyl-2,4,6-tri-(4-hydroxyphenyl)-hep-2-ene, 4,6-dimethyl-2,4,6-(4-hydroxyphenyl-heptane, 1,3,5-tri-(4-hydroxyphenyl)-benzene, 1,1,1-tri-(4-hydroxy-phenyl)-ethane, tri-(4-hydroxyphenyl)-phenylmethane, 2,2-bis-[4,4-bis-4-hydroxyphenyl-cyclohexyl]-propane, 2,4-bis-4-hydroxyphenyl-isopropyl-phenol, 2,6-bis-(2-hydroxy-5'-methylbenzyl-4-methylphenol, 2-(4-hydroxyphenyl)-2-(2,4-dihydroxyphenyl)-propane, hexa-[4-(4-hydroxyphenylisoprophyl)-phenyl] orthoterephthalic acid ester, tetra-(4-hydroxyphenyl)-methane, tetra-[4-(4-hydroxyphenylisopropyl)-phenoxy-methane and 1,4-bis-[4',4''-dihydroxy-triphenyl)-methyl]-benzene. Other suitable trifunctional compounds are 2,4-dihydroxybenzoic acid, trimesic acid, cyanuric chloride and 3,3-bis-(3-melhyl-4-hydroxyphenyl)-2-oxo-2,3-hydroindole.

The polycarbonates according to the invention are preferably prepared by the phase boundary process (as described for instance in H. Schnell, Chemistry and Physics of Polycarbonate, Polymer Reviews, Volume IX, page 33, et. seq., Interscience Publishers, (1964)), incorporated herein by reference.

Regulating the molecular weight of the polycarbonate resin is attained by use of monohydric aromatic hydroxy compounds. These are well known and include monophenols such as isooctylphenol, cumylphenol, m- and p-methylphenol, m- and p-ethylphenol, m- and p-propylphenol and m- and p-isopropylphenol, p-bromophenol and m and p-butylphenol, and para-t-butylphenol. The preferred embodiments entail a polycarbonate resin having chain terminators conforming to

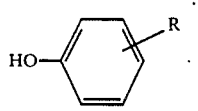

(I)

wherein R represents a branched alkyl radical consisting of 4 to 10 carbon atoms. Most preferred polycarbonate resins having chain terminators of this type have been disclosed in U.S. Pat. No. 4,269,964 which is incorporated herein by reference. The preferred polycarbonates represent an improvement of hydrolysis resistance, critical thickness and mechanical and thermal properties.

A guerbet alcohol is the condensation product of two molecules of alcohol joined at the beta carbon of the alcohol which has retained the hydroxy functionality. The resulting highly branched primary alcohol contains a single hydroxyl group. The guerbet alcohols suitable in the preparation of the present invention is characterized in that it contains 10 to 60 carbon atoms and include the alcohols disclosed in U.S. Pat. No. 4,425,458 the relevant disclosure of which is incorporated by reference herein. The monoesters of the present invention are prepared by using as the acid component a monoacid, including monocarboxylic fatty acids and hydroxy fatty acids, or its anhydride characterized in that it contains less than 25 carbon atoms, preferably, 1 to 22 carbon atoms. In the reaction one mole of the alcohol is reacted with one mole of the acid or its anhydride.

The preparation of the monoesters of the invention follows conventional, known procedures which will be readily apparent to those skilled in the art, see for instance the manuscript "Advanced Organic Chemistry" by J. March, McGraw-Hill Publishers, 1977. Suitable monoesters are available from Alkaril Chemical Incorporated.

The invention is further illustrated but is not intended to be limited by the following examples in which all parts and percentages are by weight unless otherwise specified.

EXAMPLES

In demonstrating the efficacy of the presently claimed esters as mold release agents in thermoplastic polycarbonate compositions a comparison to other, known mold release agents was made and the results are shown below. Accordingly, the following agents were used:

The mold release labeled "I" in the table below is an ester within the scope of the present invention. This is an ester of a guerbet alcohol, produced by the reaction of hydroxystearic acid with a guerbet alcohol having 20 carbon atoms, followed by the esterification of the stearyl alcohol group with stearic acid.

The agent marked "D" is a diester of guerbet alcohol having 20 carbon atoms and dodecane dioic acid (1046-272B).

A prior art compound, pentaerythritol tetrastearate, which is a widely used commercially available mold release agent in polycarbonate molding compositions is noted below as "P".

All the compositions were prepared on a ZSK 30 twin screw extruder on two separate days and the moldings were carried out on two separate days. A control sample and a sample with 0.45% of the compound identified above as "P" were molded on two consecutive days under identical conditions and their properties were determined to be identical indicating the reliability of the test procedure.

A Stokes 300 ton, 15 oz. molding machine with a Haag modified tumbler mold was used in molding the test specimens. The mold has been equipped to measure the release forces (in p.s.i.) monitored from the ejector hydraulic system, and recorded on a strip chart. The molding conditions were as follows:

| Temperatures (°F.) | |
| --- | --- |
| Nozzle | 520 |
| Front | 550 |
| Center | 550 |
| Rear | 550 |
| Mold moving water | 80 |
| Mold stationary water | 130 |
| Mold cavity | 126 |
| Timers (seconds) | |
| Injection hold | 15 |
| Clamp hold | 35 |
| Decompression | 0 |
| Clamp open | 2.5 |
| Pressure | |
| Clamp Injection (tons) | 300 |
| Clamp hold (tons) | 100 |
| Inject 1st stage (psi) | 1600 |
| Inject 2nd stage (psi) | 800 |
| Back pressure | 50 |
| Flow control | |
| Screw speed (rpm) | 120 |
| Fill indicator (set/in.) | 2.25 |
| Melt Temperature (°F.) | 560–570 |

In the preparation of the molding compositions below the resins were Makrolon 2608 polycarbonate (control b) and Makrolon 2508 (control a) polycarbonate, both of which are homopolycarbonate resins based on bisphenol A. The corresponding melt flow indices of these resins are 11.9 and 14.8 gm/10 min. in accordance with ASTM D 1238. Both resins are substantially similar one to the other in terms of their mold release characteristics.

The compositions which are described below were prepared and their properties determined as summarized in the following table:

| | | Yellowness Index for parts molded at | |
| --- | --- | --- | --- |
| COMPOSITION | Release Force (psi) | 550° F. | 700° F. |
| Control a, no additive | 256 | 3.72 | — |
| +0.5% "I" | 185 | — | — |
| +1.0% "I" | 132 | 3.12 | 3.86 |
| +0.45% "P" | 187 | 2.83 | 3.94 |
| +0.20% "D" | 250 | 3.01 | 3.23 |

-continued

| COMPOSITION | Release Force (psi) | Yellowness Index for parts molded at | |
| --- | --- | --- | --- |
| | | 550° F. | 700° F. |
| +0.40% "D" | 241 | 3.40 | 3.0 |
| Control b, no additive | 383 | — | — |
| +0.45% "I" | 248 | 3.12 | 3.86 |
| +0.45% "P" | 256 | 2.83 | 3.94 |

As is clearly evident from the results tabulated above, the effectiveness of the release agents of the present invention is considerably greater than that of the diesters of the prior art. The agents of the invention are at least as effective as the tetra stearate based agent.

The composition of the invention may include additional agents for their art recognized function. These include stabilizing agents, such as hydrolysis and thermal stabilizers as well as UV absorbers, pigments, dyes fillers and any of the known reinforcing agents.

The invention thus described may be modified without departure from the scope of the claims.

What is claimed is:

1. A thermoplastic molding composition comprising an aromatic polycarbonate resin and a sufficient amount of a monoester derived from a $C_{10-60}$ guerbet alcohol and at least one member selected from the group consisting of a monocarboxylic fatty acid and a monocarboxylic hydroxy fatty acid and the anhydrides of said acids, said acid being characterized in that it contains less than 25 carbon atoms said sufficient amount being that amount which lowers the force needed to release a molded part made from the composition from its mold in comparison to a similarly molded part from which said ester is absent.

2. The composition of claim 1 wherein said amount is about 0.05 to 3.0 percent relative to the weight of the composition.

3. The composition of claim 1 wherein said amount is about 0.1 to 1.5 percent relative to the weight of the composition.

4. The composition of claim 2 wherein said guerbet alcohol contains about 16 to 60 carbon atoms in the molecule.

5. The composition of claim 2 wherein said guerbet alcohol contains about 20 carbon atoms in the molecule.

6. The composition of claim 1 wherein said acid contains less then 25 carbon atoms in the molecule.

* * * * *

Notice of Adverse Decisions in Interference

In Interference No. 102,779, involving Patent No. 5,001,180, C. E. Lundy, S. Krishnan, D. K. Booher, RELEASE AGENTS FOR POLYCARBONATE MOLDING COMPOSITION, final judgment adverse to the patentees was rendered May 6, 1992, as to claims 1-6.

*(Official Gazette August 25, 1992.)*